Patented July 22, 1952

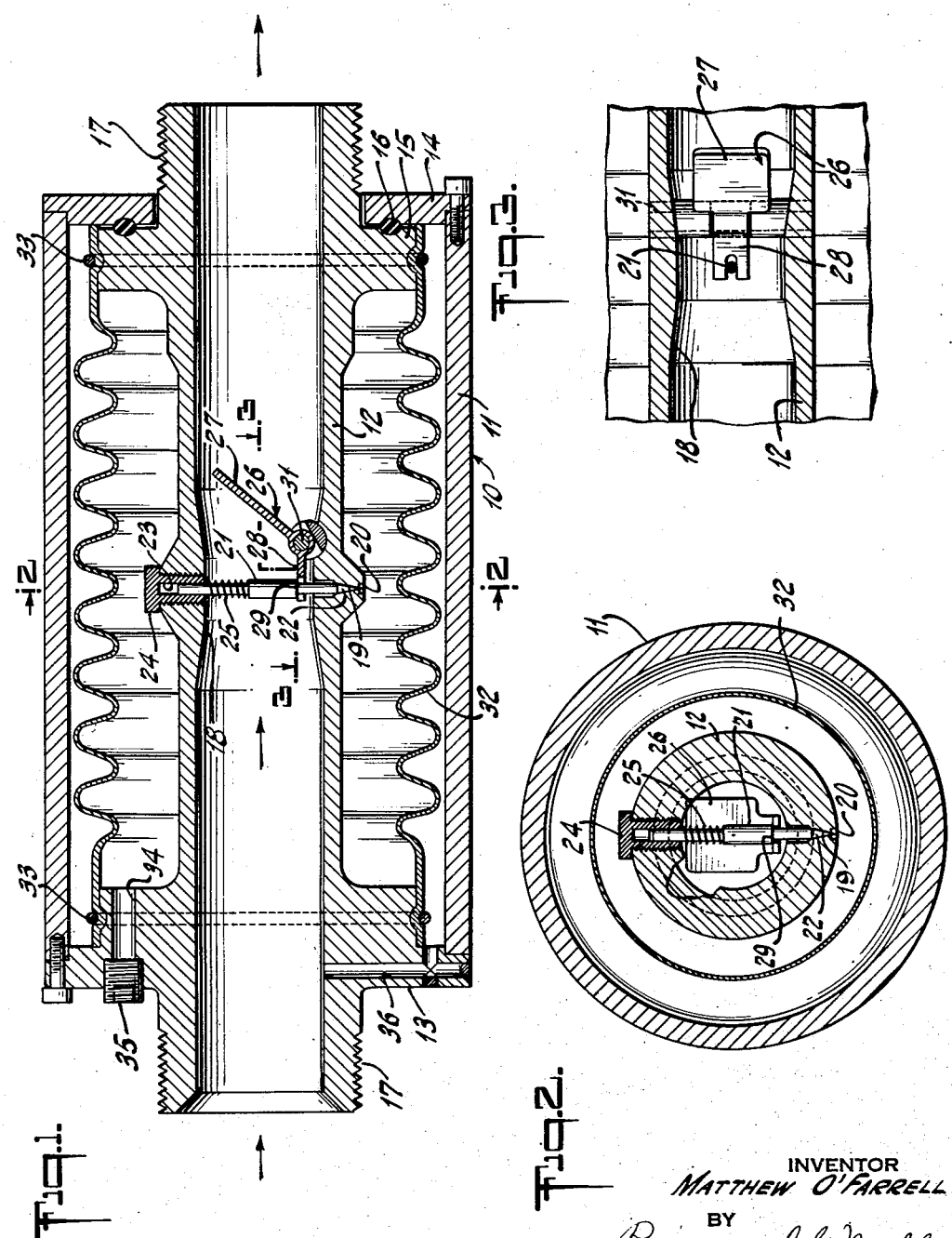

2,604,189

UNITED STATES PATENT OFFICE 2,604,189

LINE OILER

Matthew O'Farrell, Detroit, Mich., assignor to Chicago Pneumatic Tool Company, New York, N. Y., a corporation of New Jersey Application January 28, 1950, Serial No. 141,073

5 Claims. (Cl. 184—55)

1

This invention relates to lubricating devices and more particularly to a line oiler for use in air lines of air operated tools and devices.

Briefly, the invention comprises a container surrounding a conduit or pipe which can be connected to an air line so that the air stream passes therethrough. A collapsible lubricant reservoir is arranged within the volume formed between the container and pipe. The pipe has a Venturi-like restriction at the mid-portion; and a needle valve, arranged in the region of the restriction, is operable to allow lubricant to pass from the reservoir through an aperture to the air stream. A paddle shaped lever positioned within the pipe, is adapted to move the needle valve to open position when air is passing through the pipe. Full line pressure is maintained on the exterior surface of the reservoir at all times. A compression spring is arranged to keep the needle valve in closed position when air flow ceases. The Venturi-like restriction causes a decrease in air pressure at the reservoir aperture during air flow, and since full line pressure is maintained on the exterior surface of the reservoir, the lubricant within the reservoir is subjected to a pressure differential which assures positive flow of lubricant to the air stream during flow through the pipe.

An object of the invention is to provide a line oiler in which a positive addition of lubricant to the air stream, is assured during air flow therethrough. Another object is to provide a line oiler in which the flow of lubricant from the reservoir is positively cut off when the air flow ceases. A further object of the invention is to provide a line oiler which will operate efficiently in any position of use. Further objects are the provision of a line oiler which is simple in structure and with few moving parts, reliable in operation, conveniently installed, and which is easily serviced.

These and further objects and features of the invention will be apparent from the following description when read in conjunction with the accompanying drawing, wherein:

Fig. 1 is a longitudinal section of an embodiment of the invention;

Fig. 2 is a cross section as seen from line 2—2 of Fig. 1; and,

Fig. 3 is a partial section view as seen from line 3—3 of Fig. 1 looking downwardly.

Referring now to Fig. 1 of the drawing, a line oiler 10 comprises a container or outer casing 11, which surrounds a conduit or pipe 12, one end of the casing being affixed to a flange 13 formed on the pipe, the other end of the casing being affixed to an end plate 14 which is supported by the pipe and in abutting relationship with another flange 15 formed on the pipe. A gasket 16 is compressively maintained between the end plate 14 and flange 15 to form a liquid tight joint therebetween. Each end of the pipe 12 extends beyond the casing 11 and is threaded at 17 so that the oiler 10 may be connected into an air line leading to the tool or device being supplied. At the inner mid-portion of pipe 12 is a Venturi-like restriction 18, having a tapered valve seat 19 and aperture 20 arranged in the region of minimum diameter.

A needle valve 21 positioned transverse to the axis of the pipe 12, has a tapered end 22 which seats in the valve seat 19 to close aperture 20, the other end of the valve 21 being slidably engaged within a bore 23 of a guide nut 24, positioned in the wall of pipe 12 opposite the aperture 20. A spring 25 surrounding a portion of the valve body is compressively maintained to urge the valve toward seated position. Positioned within the pipe 12 is a valve operating element 26, which is somewhat L-shaped, one leg 27 being flat and having a substantial area, the other leg 28 being forked to engage a shoulder 29 formed on the valve 21. The valve operating element 26 is pivotally mounted upon a pin 31 which is positioned transverse to the axis of the pipe 12.

It will be seen that when the air stream passes through the pipe 12 in the direction as indicated by the arrows in Fig. 1, the leg 27 acts as a vane whereby the valve operating element 26 will be caused to rotate clockwise about the pin 31, as a result of which the valve 21 will be lifted upwardly whereby it will be unseated and aperture 20 will be opened.

Surrounding the pipe 12 and enclosed within container 11, is a corrugated cylindrical reservoir 32, preferably made of a resilient oil resistant material such as that known to the trade as "Duprene." The ends of the reservoir 32 are affixed to the flanges 13 and 15 of pipe 12 in fluid tight manner by means of wire retainers 33. A reservoir filling hole 34 having a pipe plug 35 is arranged in the flange 13 as shown. Also located in flange 13, is a passageway 36 which extends from the interior of the pipe 12 to the region exterior of the reservoir 32 to maintain line pressure on the reservoir at all times that air is in the line.

When air begins to pass through the line oiler at commencement of tool operation, the valve operating element 26 is rotated, as heretofore explained, and the needle valve 21 is lifted, thereby uncovering aperture 20. Lubricant thereupon passes from the reservoir 32 to the air stream, the passage of lubricant being positive and steady due to the pressure differential caused by the line pressure acting on the exterior surface of the reservoir 32, and the reduced pressure which exists at the aperture 20 by virtue of the Venturi-like restriction 18. As long as live air flow continues through the pipe, the needle valve will be maintained in open position and lubricant from the reservoir 32 will be added to the air flow. Immediately upon cessation of air flow, spring 25 will return the needle valve 21 to closed position, and all moving parts will assume original position as shown in Fig. 1.

At the same time the air pressure on the reservoir 32 drops with the live pressure in pipe 12. It is apparent therefore that there can be no flood of oil into the pipe when the supply of live air is cut off from the line oiler as in the case of most prior devices. As the supply of lubricant within the reservoir is decreased upon use, the wall of the reservoir will be forced inwardly toward the pipe 12, by reason of the air line pressure acting on the outer surface of the reservoir. This serves a twofold purpose, namely, to eliminate low pressure areas within the reservoir, and to maintain a supply of lubricant in the region of the aperture 20.

What is claimed is:

1. A line oiler comprising a container, a conduit extending through the container, a collapsible lubricant reservoir arranged within the container exterior to the conduit, a needle valve positioned within the conduit and operable to admit lubricant from the reservoir into the conduit, a valve operating element arranged within the conduit and responsive to the flow of live air to operate the needle valve, and means, including a Venturi-like restriction formed in the conduit in the region of the needle valve, to provide a pressure differential on lubricant within the reservoir during live air flow to thereby assure the admittance of lubricant to the conduit.

2. A line oiler comprising a container, a conduit extending through the container and including means at each end for connection to a live air line, a collapsible lubricant reservoir arranged within the container exterior to the conduit, a needle valve located transversely within the conduit and operable to admit lubricant from the reservoir into the conduit, a valve operating element arranged within the conduit and responsive to the flow of live air to operate the needle valve, resilient means adapted to resist movement of the needle valve to operable position, and means including a Venturi-like restriction formed in the conduit and a passageway extending from the inner surface of the conduit to the exterior surface of the reservoir, said means arranged to provide a pressure differential on the lubricant within the reservoir during live air flow to thereby assure the admittance of lubricant to the conduit.

3. A line oiler comprising a container, a conduit extending through the container and including means at each end for connection to live air line, said conduit having a pair of spaced flanges enclosed by the container, a corrugated resilient lubricant reservoir arranged within the container, the ends of the reservoir being affixed to the flanges in liquid tight manner, a needle valve located transversely within the conduit, one end of the needle valve being tapered and adapted in closed position to seat in an aperture which connects the reservoir and the conduit, the other end of which slidably engages a guide nut arranged in the wall of the conduit, a valve operating element located in the conduit comprising an L-shaped paddle, one leg of which has a flat surface arranged crosswise to the axis of the conduit, the other leg being forked and engaging a shoulder formed on the body of the needle valve, said valve operating element responsive to the flow of live air to unseat the needle valve, resilient means arranged to urge the needle valve to seated position, and means to provide a pressure differential on the lubricant within the reservoir during live air flow, including a Venturi-like restriction formed in the conduit in the vicinity of the needle valve, and a passageway in one of flanges, one end of the passageway opening on the inner surface of the conduit, the other end opening in a region exterior to the reservoir but interior to the container.

4. A line oiler according to claim 3 wherein a reservoir filling means is arranged in one of the conduit flanges.

5. A line oiler comprising a container, a conduit passing through the container, a collapsible lubricant reservoir arranged within the container and extending about the conduit, a valve means positioned in the conduit including a reciprocable member having a tapered end for seating in a tapered aperture which forms a means of egress for lubricant from the reservoir to the inside of the conduit and an air flow responsive means for movement of the reciprocable member, resilient means urging the reciprocable member toward the tapered aperture, and means to provide a pressure differential on lubricant within the reservoir during air flow through the conduit.

MATTHEW O'FARRELL.

REFERENCES CITED

The following references are of record in the file of this patent:

UNITED STATES PATENTS

| Number | Name | Date |
|---|---|---|
| 1,751,714 | Peters | Mar. 25, 1930 |
| 1,984,422 | Nell | Dec. 18, 1934 |
| 2,105,490 | Noble | Jan. 18, 1938 |
| 2,105,492 | Gartin | Jan. 18, 1938 |
| 2,430,361 | O'Farrell | Nov. 4, 1947 |